US008346729B2

(12) United States Patent
Brannon et al.

(10) Patent No.: US 8,346,729 B2
(45) Date of Patent: Jan. 1, 2013

(54) BUSINESS-SEMANTIC-AWARE INFORMATION LIFECYCLE MANAGEMENT

(75) Inventors: Karen W. Brannon, Palo Alto, CA (US); Ying Chen, San Jose, CA (US); Lesley Mbogo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 11/561,394

(22) Filed: Nov. 18, 2006

(65) Prior Publication Data

US 2008/0120465 A1 May 22, 2008

(51) Int. Cl.
G06F 7/00 (2006.01)
G06F 17/00 (2006.01)
(52) U.S. Cl. ........................................ 707/661; 707/758
(58) Field of Classification Search ........................ None
See application file for complete search history.

(56) References Cited

U.S. PATENT DOCUMENTS

| | | | |
|---|---|---|---|
| 5,379,423 A * | 1/1995 | Mutoh et al. | 707/204 |
| 5,813,009 A | 9/1998 | Johnson et al. | |
| 7,007,048 B1 * | 2/2006 | Murray et al. | 707/204 |
| 7,448,046 B2 * | 11/2008 | Navani et al. | 719/316 |
| 7,680,813 B2 * | 3/2010 | Ushijima | 707/999.102 |
| 2002/0032692 A1 * | 3/2002 | Suzuki et al. | 707/200 |
| 2004/0059611 A1 | 3/2004 | Kananghinis et al. | |
| 2005/0043982 A1 * | 2/2005 | Nguyen | 705/8 |
| 2005/0055211 A1 | 3/2005 | Claudatos | |
| 2005/0091093 A1 * | 4/2005 | Bhaskaran et al. | 705/7 |
| 2005/0125768 A1 | 6/2005 | Wong et al. | |
| 2005/0138081 A1 * | 6/2005 | Alshab et al. | 707/200 |
| 2005/0203771 A1 * | 9/2005 | Achan | 705/2 |
| 2006/0004819 A1 | 1/2006 | Claudatos | |
| 2006/0004847 A1 * | 1/2006 | Claudatos et al. | 707/103 R |
| 2006/0004868 A1 * | 1/2006 | Claudatos et al. | 707/104.1 |
| 2006/0064555 A1 * | 3/2006 | Prahlad et al. | 711/154 |
| 2006/0101071 A1 * | 5/2006 | Henderson | 707/104.1 |
| 2006/0129745 A1 * | 6/2006 | Thiel et al. | 711/100 |
| 2006/0179061 A1 * | 8/2006 | D'Souza et al. | 707/10 |
| 2006/0229896 A1 * | 10/2006 | Rosen et al. | 705/1 |
| 2006/0230044 A1 * | 10/2006 | Utiger | 707/10 |
| 2006/0259813 A1 * | 11/2006 | Ushijima | 714/6 |
| 2007/0011420 A1 * | 1/2007 | Boss et al. | 711/165 |

(Continued)

OTHER PUBLICATIONS

"Alchemy Suite Overview: Software for Managing the Content Lifecycle," Captaris, 2005, http://www.captaris.com/cms_resources/pdfs/alchemy/datasheets/AL_Suite_OV_0505.pdf.

(Continued)

*Primary Examiner* — Usmaan Saeed
(74) *Attorney, Agent, or Firm* — Anthony V S England; Mohammed Kashef

(57) ABSTRACT

For information lifecyle management (ILM) a process receives a user-definition of ILM actions, data state transitions, and associations among the respective data state transitions and ILM actions and responsively stores a data structure representing the received data state transitions, ILM actions, and correspondence among the respective data state transitions and ILM actions. A process for an ILM model detects a workflow definition event in a monitored process running on a computer system. An information lifecycle flow data structure for the workflow definition is stored responsive to the workflow definition in the monitored process having a data state transition matching one of the user-defined data state transitions, wherein the information lifecycle flow data structure models the matching data state transition, so that the ILM action corresponding to the matching data state transition may be performed for the data responsive to occurrence of a workflow process event in which the matching data state transition occurs.

20 Claims, 7 Drawing Sheets

U.S. PATENT DOCUMENTS

| | | | |
|---|---|---|---|
| 2007/0061539 A1* | 3/2007 | Nonaka et al. | 711/170 |
| 2007/0094248 A1* | 4/2007 | McVeigh et al. | 707/4 |
| 2007/0100887 A1* | 5/2007 | Subramanian et al. | 707/104.1 |
| 2007/0179990 A1* | 8/2007 | Zimran et al. | 707/201 |
| 2007/0185934 A1* | 8/2007 | Cannon et al. | 707/204 |
| 2007/0260640 A1* | 11/2007 | Hamilton et al. | 707/200 |
| 2007/0271306 A1* | 11/2007 | Brown et al. | 707/200 |
| 2008/0126404 A1* | 5/2008 | Slik et al. | 707/103 R |
| 2009/0125884 A1* | 5/2009 | Hsu et al. | 717/120 |
| 2009/0240737 A1* | 9/2009 | Hardisty et al. | 707/200 |

OTHER PUBLICATIONS

Steinmetz, Ralf, "Cluster 2 in 2005: Emerging IT Architectures to Support Business Process within the E-Finance Industry," E-Finance Lab: Project Proposals, WP 1.3, 2005.

"HT File Store: Intelligent Storage Management for Your Corporate Data," BridgeHead Software, White Paper, M8130, Version 1.1, Rev. 3, May 2005.

"HT Data Repository: Providing Unlimited Storage Capacity for Application Data," BridgeHead Software, White Paper, M8110, Version 1.1, Rev. 2, Mar. 2005.

"Policy-Based Data Management: The Cornerstone of ILM," Data Mobility Group, White Paper, 2004.

Fraas, Lynn, "Leveraging ECM and BPM Technology in Compliance," Doculabs, aim, 2004, http://www.aiimne.org/DoculabsAIIMNE03-16-05.pdf.

International Search Report and Written Opinion dated Feb. 15, 2008, Application No. pct/ep2007/061035, 9 pages.

* cited by examiner

US 8,346,729 B2

BUSINESS-SEMANTIC-AWARE INFORMATION LIFECYCLE MANAGEMENT

BACKGROUND

1. Field of the Invention

The present invention concerns information lifecycle management.

2. Related Art

Large quantities of information pose new management challenges to enterprises, particularly with regard to business goals such as cost, performance, reliability, and availability. Recent regulatory requirements, e.g., Sarbanes-Oxley, HIPAA, and DOD, which mandate corporations to maintain fixed-content reference data safely for years, impose additional complexity on information management.

Referring now to FIG. 1, a typical prior art Information Lifecycle Management ("ILM") system 100 is depicted. System 100 includes a stack of storage hardware and software layers, including storage devices 102, such as magnetic disk and WORM optical disk or tape; storage software 104 providing record repository functions; middleware 106 providing content management functions, including software such as Documentum, DB2, Content Management ("CM") and Information Record Manager ("IRM"); applications 106, such as e-mail and Lotus Notes and medical imaging; and high level applications 108, such as SAP and WebSphere Business Integrator (WBI). These layers of system 100 work together as a whole to deliver key business functions, such as analyst report processing, to meet business goals. Unfortunately, existing ILM systems manage information based primarily on usage frequency, age, and data types, with the result that such systems tend to be untrustworthy, hard to manage, and poorly integrated. Consequently, a need exists for improvements in computer systems for storing large amounts of information, including systems such as depicted in FIG. 1.

SUMMARY OF THE INVENTION

The present invention addresses the foregoing need. According to one form of the invention, a method for information lifecyle management (ILM) includes receiving, by a process running on a computer system, a user-definition of ILM actions data state transitions and associations among the respective data state transitions and ILM actions and responsively storing a data structure representing the received data state transitions, ILM actions, and correspondence among the respective data state transitions and ILM actions. A process for an ILM model running on the computer system detects a workflow definition event in a monitored process running on a computer system. An information lifecycle flow data structure for the workflow definition is stored responsive to the workflow definition in the monitored process having a data state transition matching one of the user-defined data state transitions. The information lifecycle flow data structure models the matching data state transition, so that the ILM action corresponding to the matching data state transition may be performed for the data responsive to occurrence of a workflow process event in which the matching data state transition occurs.

In another aspect of the present invention, the process for the ILM model notifies a storage process of the computer system responsive to detecting occurrence of the workflow process event in which the matching data state transition occurs and the ILM action corresponding to the matching data state transition is performed.

In another aspect of the present invention, the notifying of the storage process includes performing a file system call.

In another aspect of the present invention, an extended file system attribute is set responsive to the file system call.

In another aspect of the present invention, performing the ILM action corresponding to the matching data state transition includes making a copy of data and moving the data to WORM storage responsive to the data being changed from a non-record to a record state.

In another aspect of the present invention, a storage system is operable for the data includes a primary, caching storage mode and a secondary non-caching storage mode. Performing the ILM action corresponding to the matching data state transition includes moving data directly from the primary storage mode to the secondary storage mode responsive to data changing from an active state to a less active or inactive state, and moving data directly from the secondary storage mode to the primary storage mode responsive to data changing from the less active or inactive state to the active state.

In another aspect of the present invention, the ILM action corresponding to the matching data state transition includes migrating data from WORM disk to WORM tape responsive to the data being a record and the data state changing from an active state to an inactive state.

In another aspect of the present invention, a storage system is operable for the data includes primary and secondary storage modes, wherein the primary storage mode is relatively more expensive than the secondary storage mode. Performing the ILM action corresponding to the matching data state transition includes migrating data to secondary storage mode without going through a fixed migration path if the data is changed from a valuable state to a less valuable state or not valuable state and migrating data to the primary storage mode without going through a fixed migration path if the data is changed from the less valuable state or the not valuable state the valuable state.

In another aspect of the present invention, performing the ILM action corresponding to the matching data state transition includes keeping data in a caching storage mode responsive to a value state of the data exceeding a certain high value threshold even if a usage state of the data does not exceed a certain high usage threshold.

In another aspect of the present invention, a storage system is operable for the data includes primary and secondary storage modes, wherein the primary storage mode is relatively more expensive than the secondary storage mode. Performing the ILM action corresponding to the matching data state transition includes selecting data to migrate to the secondary storage mode responsive to a value data state, a usage data state, or a combination of the value and usage data states.

In another form, a computer program product for information lifecycle management (ILM) is stored in a tangible, computer readable media and has instructions for execution by a computer, which, when executed by the computer, cause the computer to implement the above described method.

In another form, a computer system includes a processor and a storage device connected to the processor. The storage device has stored thereon an information lifecyle management (ILM) program for controlling the processor. The processor is operative with the program to execute the program for performing the above described method.

Depending on the context, the word "information," as the term is used herein, may refer to something having meaning in a particular context, or it may refer more generally to data, which is the raw material from which meaning may be derived, such as machine readable structures fixed on a tangible, computer-readable medium. It should also be understood that in this context "data" is used in a very general sense and may include data, such as text-based or multimedia files or other data structures, that are input to and or produced by machines, including computer systems or computer programs thereof. It may also include program instructions for execution.

"Business semantic information," as the term is used herein, refers to underlying, business-related meaning derived from data that is processed, which may include processing such as storing, editing, translating, accessing, moving, or copying the data, for example. Likewise, the term may refer to business-related meaning derived from such a process itself, or the combination of the process and the data processed. It should be understood that the term "business-related" is used in a very general sense herein as relating to mechanisms, processes or purposes of an enterprise. This may include an enterprise having a profit related purpose, but it may also include an enterprise related to a non economic concern, including a concern such as government, charity, sports, art, entertainment, etc.

The term "lifecycle" in connection with information, refers to variation in value or significance that information may have to an organization over the life of the information. "Information lifecycle management" refers to actions relating to control of information storage and retrieval taking into account the information's changing value or significance.

Other variations, objects, advantages, or forms of the invention will become apparent upon reading the following detailed description and upon reference to the accompanying drawings.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
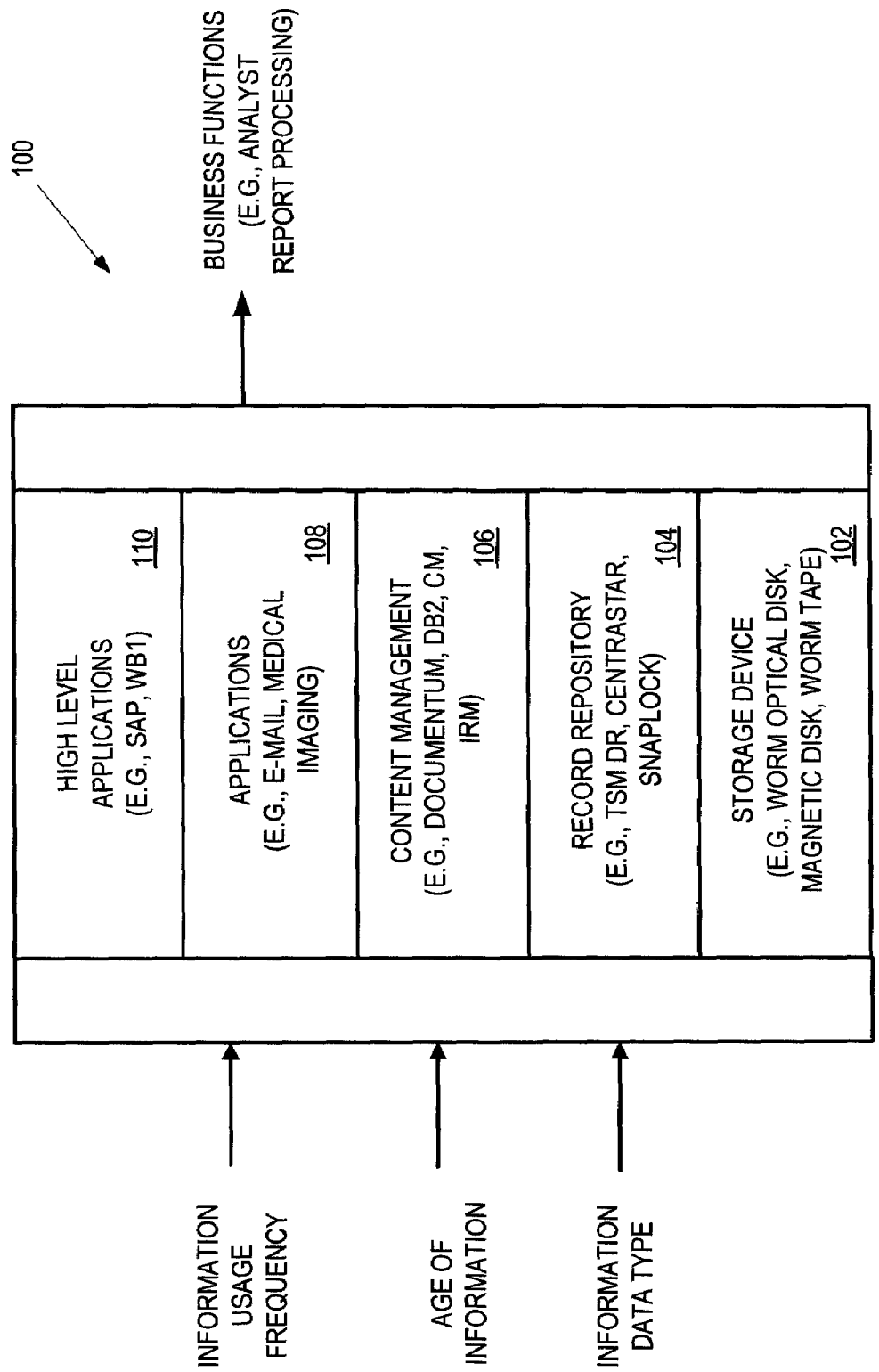
FIG. 1 illustrates a computer system for storing and managing information with particular emphasis upon certain layers of the system, according to the prior art.

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Workflow applications or middleware, such as may be implemented in SAP or IBM's WebSphere software, are widely used in connection with workflow processes. A workflow process is, in simplest terms, a flow of tasks (also referred to as "events"), which often relate to a business undertaking. In more complete terms, a workflow process includes, among other things, i) inputs and outputs for tasks, including information; ii) task responsibilities, and iii) task sequences, including dependencies among tasks and information flow. Workflow applications are used not only to structure workflow processes, but also to enable their accomplishment. That is, workflow applications enable not only the defining of inputs and outputs, sequences and responsibilities for tasks, but also execution of, and reporting about, the tasks.

The present invention involves a recognition that high level applications 110 or middleware 106, particularly workflow applications or middleware, and the underlying information that they process or relate to, often contain a significant amount of business semantic information. Some of those semantics are useful to drive ILM policies such as data placement, migration, and retention, which may be for compliance to governmental regulations, business guidelines, or the like. However, prior art solutions do not utilize business semantic information for ILM. This is at least partly because existing ILM systems have large semantic gaps across system layers.

Consider one example, as follows. The moment a document is declared a corporate record, e.g., a record subject to corporate governance requirements, a copy of the document should be written to WORM storage in order to guarantee compliance with retention, accessibility and other similar requirements. Conventional solutions do not utilize the event of declaring a document as a corporate record to move the document from read-writable storage to WORM storage. Instead, typical migration policies move data solely based on information age, usage frequency, or data type. If data is migrated only every 30 days, for example, corporate records may not be stored on the WORM storage until 30-days after the records are declared to have corporate record status, hence leaving significant security holes in the system.

System

Figure 2:
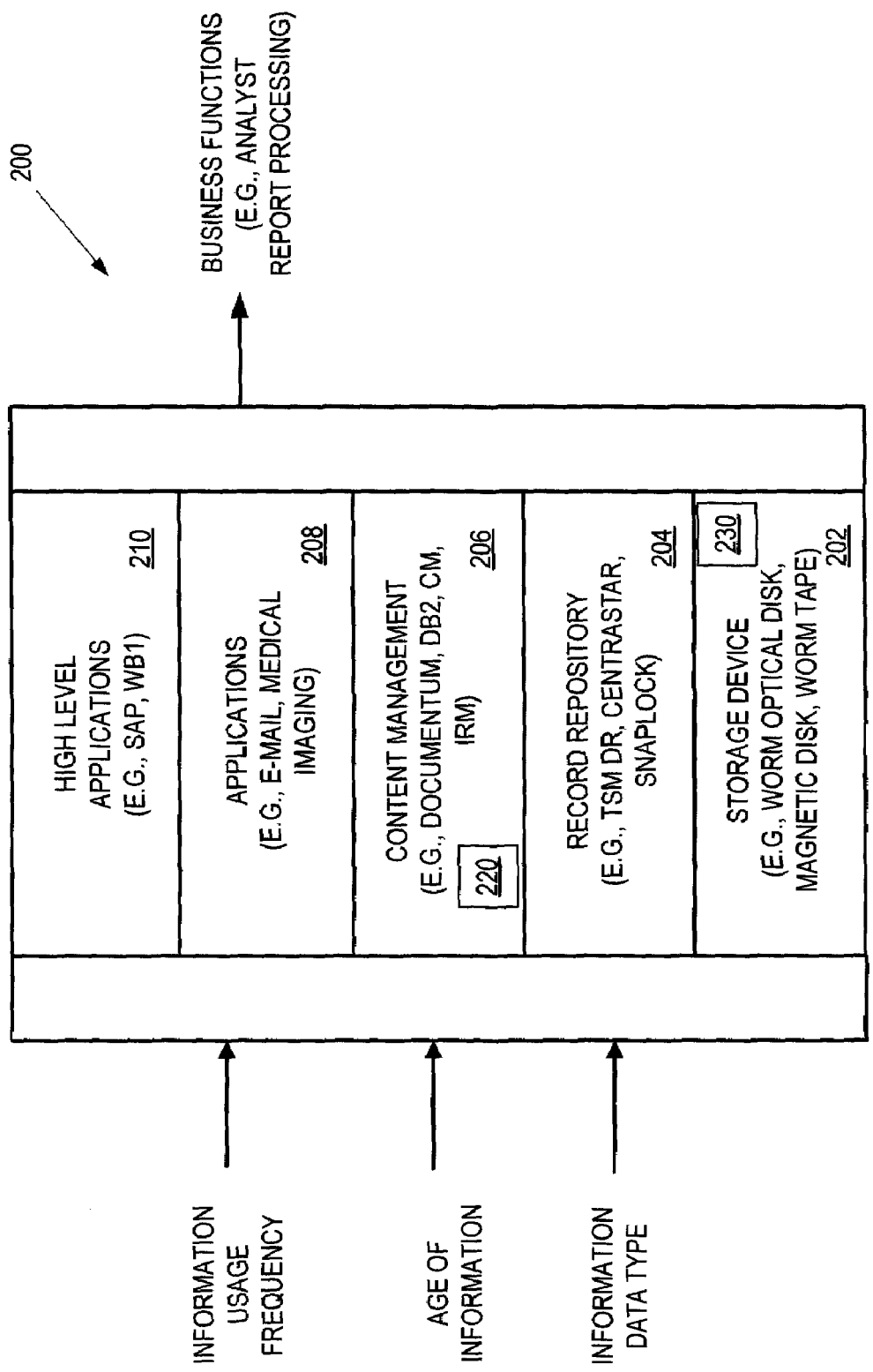
FIG. 2 illustrates a computer system for storing and managing information with particular emphasis upon certain layers of the system, according to an embodiment of the present invention.

Referring now to FIG. 2, aspects of a computer system 200 are shown, according to an embodiment of the present invention. System 200 includes a stack of storage hardware and software layers, including storage devices 202, such as magnetic disk and WORM optical disk or tape; storage software 204 providing record repository functions; middleware 206 providing content management functions, including software such as Documentum, DB2, CM and IRM; applications 208, such as e-mail, Lotus Notes, and medical imaging; and high level applications 210, such as SAP and WBI. These layers of system 200 work together as a whole to deliver key business functions, such as analyst report processing, to meet business goals.

High level business rules and processes tend to be embedded in layers 206, 208, and 210, such as workflow in CM and lifecycle codes in IRM of layer 206. However, not all business semantic information is useful for business semantic aware ILM policies. Therefore it is important for system 200 to identify business semantics that can be used to manage information for ILM purposes. In system 200, ILM business semantic logic, which is also referred to as ILM model 220, captures significant business semantic information from underlying data and information processing, such as workflow processes, which provides output to information lifecycle state representation ("ILSR") logic 230 of system 200, thereby leading to rules that are useful for ILM and bridging a semantic gap between business semantics at layers 206, 208 and 210, for example, and ILM semantics needed for managing data that is executed, stored, edited, translated, accessed, moved, or copied, for example, such as at layers 202 and 204, for example. Importantly, system 200 manages information based on logic 220 and 230 and a wider array of inputs, with the result that system 200 tends to be more trustworthy, easier to manage, and better integrated.

Automatic Capturing of Lifecycle Flows

Figure 3:
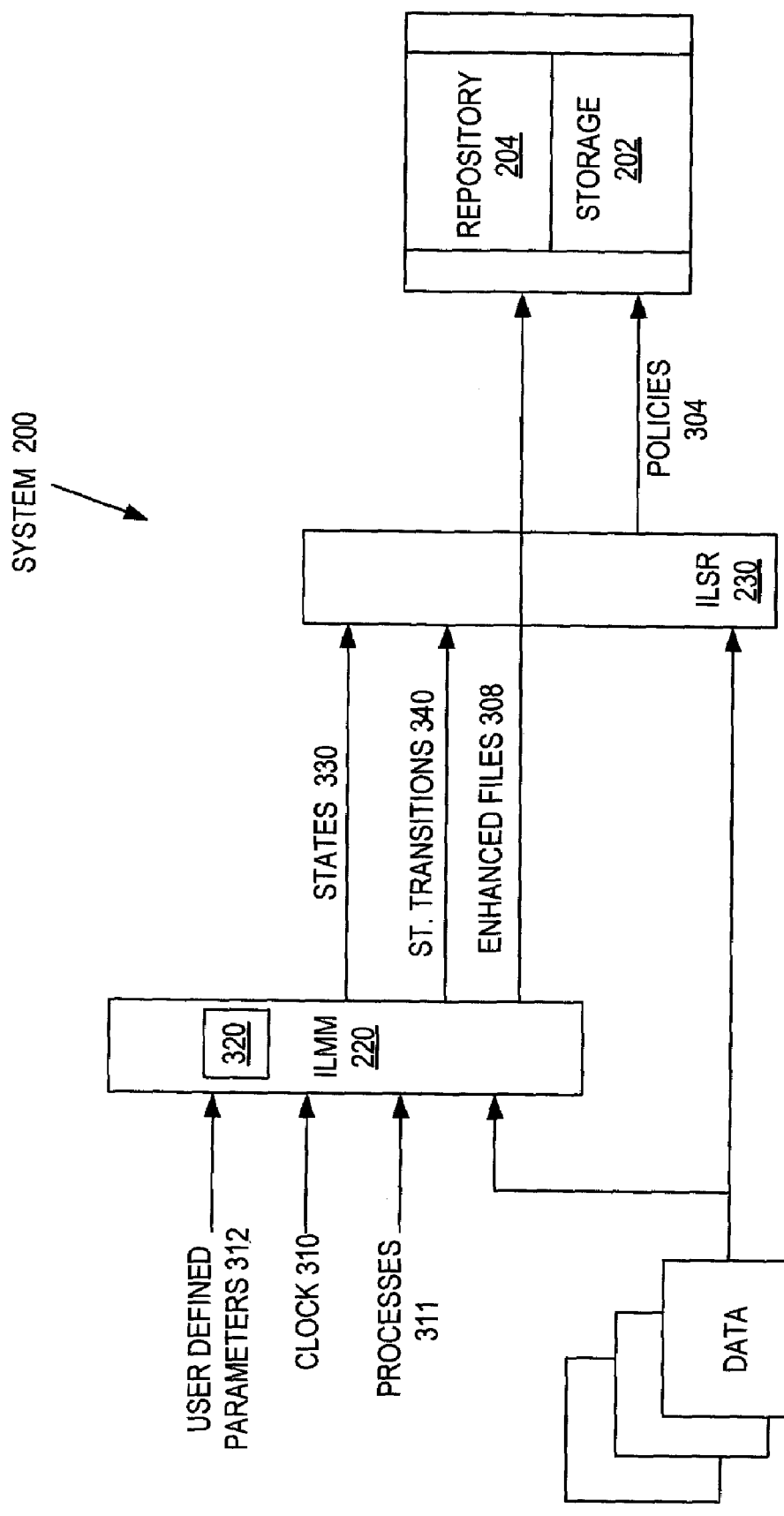
FIG. 3 illustrates details of the computer system of FIG. 2, according to an embodiment of the present invention.

Referring now to FIG. 3, additional details are shown of system 200. ILM model 220 includes predefined data structures and program instructions stored on tangible, computer readable media of system 200 (FIG. 2). The data structures define states and state transitions having business and ILM significance, and the program instructions give rise to one or more processes executing on system 200 for accomplishing actions described herein. Specifically, ILM model 220 receives the following as inputs: i) clock 310; ii) data 306, e.g., files or other data structures; iii) communication from processes 311 of layers 206, 208 and 210 (FIG. 2), including, for example, a process of e-mail application of layer 208 and a process of SAP application of layer 210; and iv) parameters 312, which may be input by a user or may be received as a communication from another system, defining events and data 306 classifications that give rise to business semantic information. As the term is used herein, an "event" may refer merely to i) passage of one or more time-based milestones detectable by ILM model 220 responsive to a defining parameter 312 and clock 310, ii) one or more transactions detectable by ILM model 220 responsive to a parameter 312 and communication from one or more of processes 311, or iii) a combination thereof. ILM model 220 is unified in terms of its operability for capturing meaning both on the basis of transactions and time.

Data structures in ILM model 220 define lifecycle flows 320 that enable a software process of model 220 to detect business significant events occurring in monitored processes 311. More specifically, and with reference now to FIG. 4, lifecycle flow 320 generally includes information states 330 and information state transitions 340, according to an embodiment of the invention. Such an information state 330 defines a condition, content, configuration or other attribute of data, such as the state of being created, reviewed, approved, rejected, archived, or deleted, for example. Such an information state transition 340 defines, for one such state 330, one or more other states 330 into which it can validly and directly be transformed, i.e., valid adjacent states 330. For instance, in the illustrated embodiment of flow 320, the states 330 "created" and "reviewed" are "adjacent" (in the sense of a mathematical graph), as is indicated by the line (also sometimes referred to as an "arc") from state 330 "created" to state 330 "reviewed," and a state transition 340 from state 330 "created" to state 330 "reviewed" is, therefore, valid. However, the states 330 "created" and "rejected" are not adjacent, as is indicated by the absence of a line there between, and a state transition 340 from "created" to "rejected" is not valid.

Figure 4:
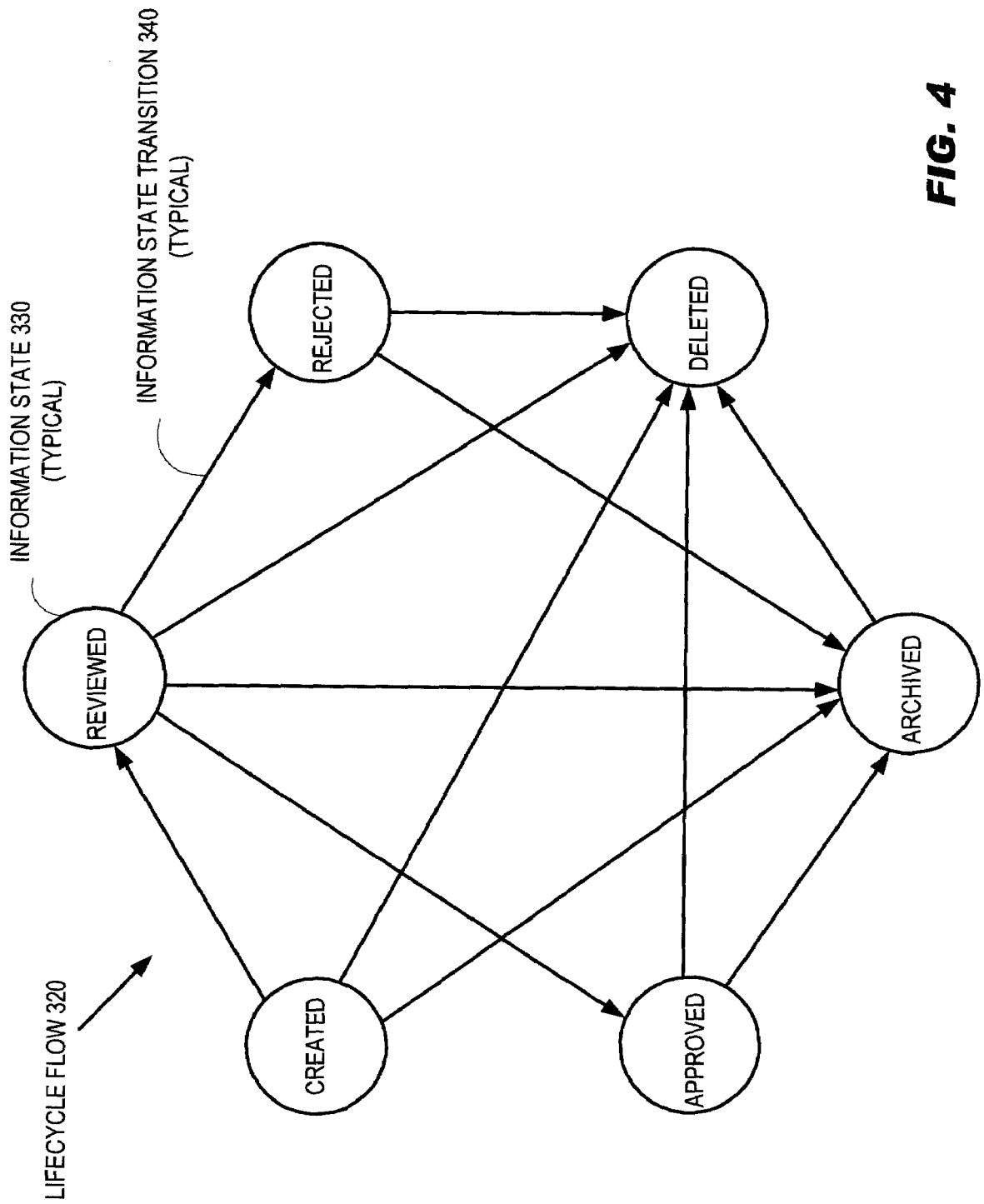
FIG. 4 illustrates a uniform information lifecycle management flow, according to an embodiment of the present invention.

Lifecycle flow 320 as shown in FIG. 4 has particularly defined states 330 with a particularly defined arrangement of state transitions 340. However, it should be understood, of course, that this is merely one illustrated embodiment of lifecycle flow 320, and other definitions of states 330 and their interrelation by state transitions 340 are possible. For example, while the states 330 shown in FIG. 4 are defined by processing conditions, states 330 in another embodiment of a lifecycle flow 320 may be defined by content of data, for example. And while an information state transition 340 such as that shown in FIG. 4 arises from mere occurrence of a business event, it should be understood that such a transition 340 may arise from a content change in data in another embodiment of flow 320. Also, recall that it was stated herein above that a transition may arise responsive to passage of time, occurrence of a transaction, or a combination thereof. It should be understood that a transaction may give rise to change in data content, and "occurrence of a transaction" is intended to include occurrence of change in underlying content of data arising in such a transaction.

Figure 6:
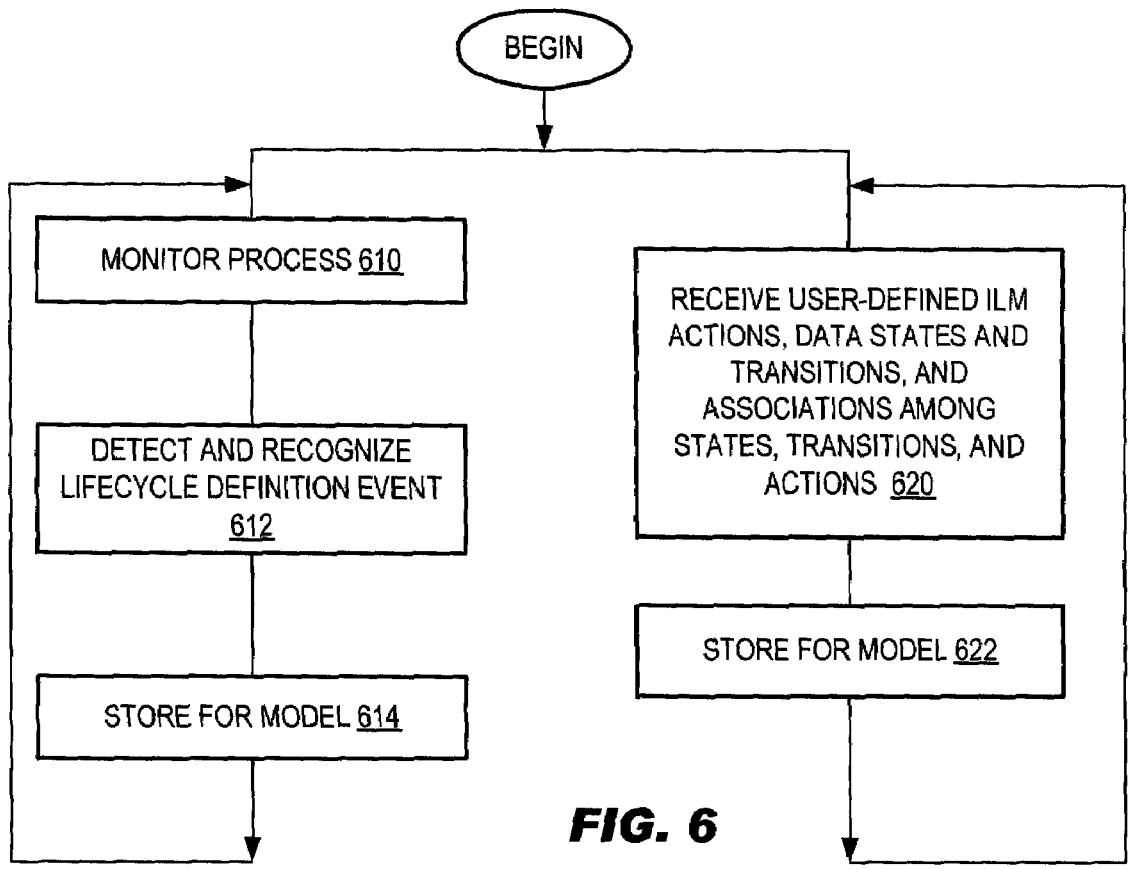
FIG. 6 illustrates a process for automatically capturing lifecycle flows, according to an embodiment of the present invention.

Lifecycle flows 320, such as the one illustrated in FIG. 4, may be captured automatically as follows, according to an embodiment of the present invention illustrated in FIG. 6. In a workflow application for a business undertaking, an event may arise in which a user specifies a workflow process, i.e., initializes, deletes or otherwise changes a workflow definition, wherein an ILM-significant state transition is defined for data, e.g., file 306. (Such a workflow definition, in which an ILM-significant state transition is defined for data may be thought of as an "information lifecycle" definition. Initializing or changing a workflow definition is referred to herein as a "workflow definition event." Correspondingly, initializing or changing an information lifecycle definition is referred to herein as an "information lifecycle definition event.") In order to capture information lifecycle definition events, which have both business and ILM significance, a process of ILM model 220 monitors 610 workflow application processes 311.

Upon detecting initialization or changing of a workflow definition that defines an ILM-significant state transition for data, the process of ILM model 220 recognizes this as an information lifecycle definition event 612 that initializes or changes a lifecycle flow 320. Accordingly, the process of ILM model 220 responsively captures 614 relevant aspects of this information lifecycle definition event 612 as a lifecycle flow 320.

It should be understood from the foregoing that a process of ILM model 220 monitors processes 311 for workflow definitions that result in ILM-significant state transition for data, thereby automatically capturing lifecycle flows, which include information state transition rules. However, this does not mean all tasks relating to data are ILM-significant. For example, a workflow process may include provision for signaling a supervisor to review a document, but this may not be significant in terms of a change in state of the document for ILM purposes.

Accordingly, ILM model 220 includes a mechanism for recognizing such an ILM-significant data state transition in monitored processes 311. That is, ILM model 220 includes a process for receiving 620 the following: i) user-defined new, changed or deleted ILM-significant data states and state transitions, i.e., data states and state transitions for which it is desirable that certain actions occur relating to ILM, and ii) user-defined ILM actions corresponding to the respective state transitions. Actions relating to ILM include actions such as storing, editing, translating, accessing, moving, or copying data, for example. Responsive to the receiving 620, ILM model 220 at 622 responsively stores modifies or deletes one or more data structures for the new, changed or deleted data states, state transitions or ILM actions. ILM model 220 recognizes an ILM-significant data state transition in monitored processes 311 responsive to matching the data state transition in the monitored processes 311 to one of the predefined, ILM-significant state transitions.

It should also be understood from the foregoing that ILM model 220 maps meaning that it captures responsive to its inputs into a uniform lifecycle flow 320. More specifically, ILM model 220 predefines certain events transacted at the level of processes 311 that have business significance, which may be of a diverse variety. ILM model 220 also predefines correspondence among the events to respective uniformly predefined states 330 or state changes 340 (FIG. 4) of lifecycle flow 320, which represent information at a business semantic information level.

Some business events are generated in an ad hoc fashion as transactions without specific time constraints. For instance, a review event may be generated whenever a reviewer has actually finished reviewing a document. The occurrence of this sort of event does not depend upon a predetermined time. Other business processes may generate business events that occur at a predetermined time or upon expiration of a predetermined processing time duration. For example, it may be known that certain financial records are only reviewed on a monthly basis. Furthermore, the reviewing itself may be bound to occur during one particular week. Accordingly, ILM model 220 communicates with business processes 311, and relates events arising from them to lifecycle flow 320, which has uniform structure and meaning for ILM purposes, even though the business processes may be arbitrary and may occur in an arbitrary manner.

Automatic Performance of ILM-Related Actions

Having captured one or more lifecycle flows 320, ILM model 220 provides output to information lifecycle state representation ("ILSR") logic 230 of system 200 responsive to recognizing its inputs in terms of uniform lifecycle flow 320. Referring again to FIG. 3, ILSR logic 230, like ILM model 220, also includes program instructions stored on tangible, computer readable media of system 200 (FIG. 2). The program instructions give rise to one or more processes executing on system 200 for accomplishing actions described herein. ILSR logic 230 also has access to the above described data structure defining ILM actions, data state transitions, and correspondences there between. In this manner, events of business significance are uniformly defined, along with ILM-related actions to take for particular ones of the business-significant events.

ILSR logic 230 detects, i.e., reads or receives notice of, states 330 and state transitions 340 (FIG. 4) of ILM model 220 and responsively adds attributes to information, e.g., files 306, thereby creating enhanced information, e.g., enhanced files 308. ILSR logic 230 then passes files 308 to record repository 204 and storage 202. ILSR logic 230 may add the attributes to files 306 via a conventional API.

Figure 5:
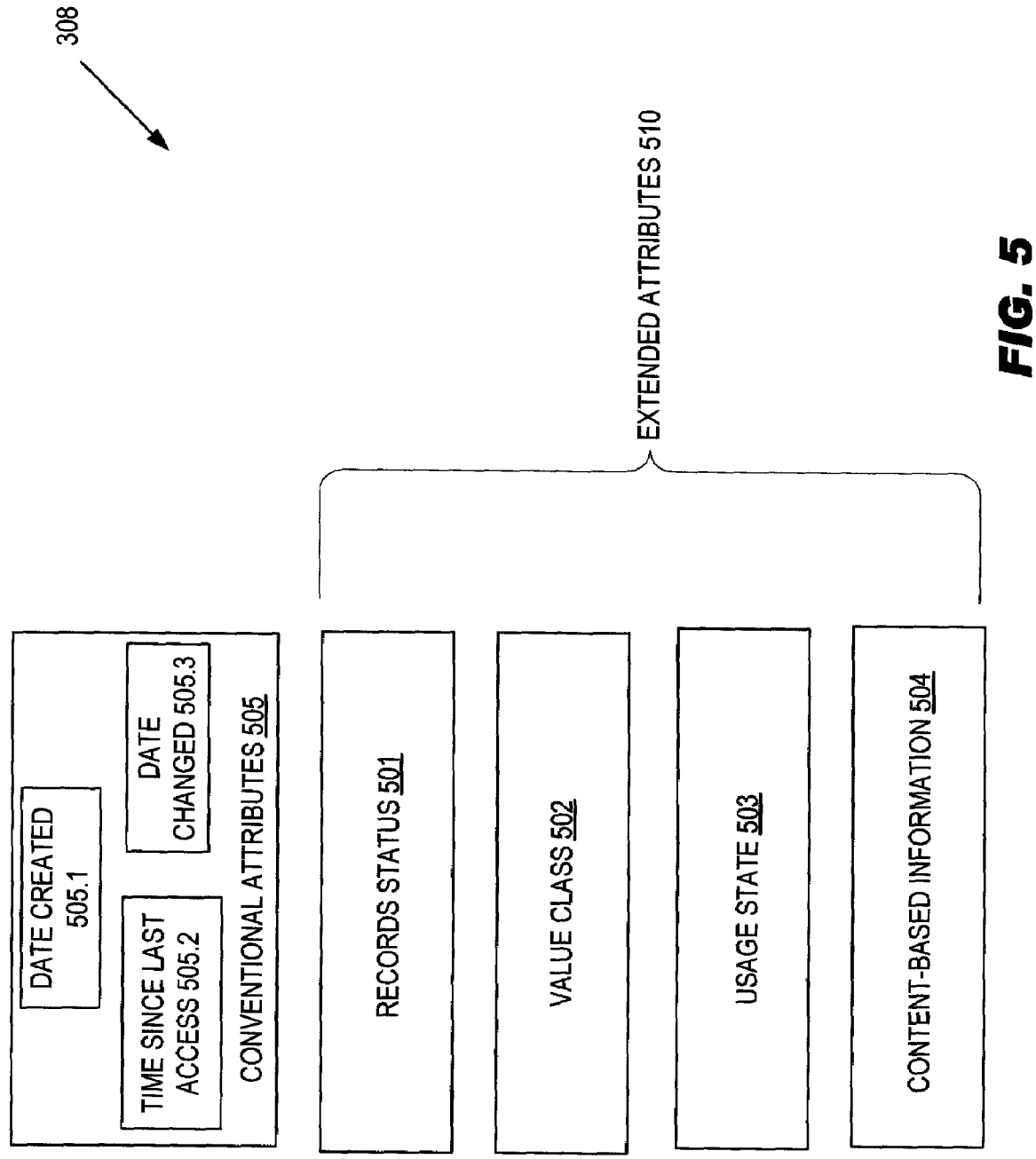
FIG. 5 illustrates additional details of certain logic of FIG. 3, according to an embodiment of the present invention.

Referring now to FIG. 5 in connection with FIGS. 3 and 4, an enhanced file 308 is illustrated according to an embodiment of the present invention. File 308 includes conventional attributes 505, such as date created 505.1, time since last access 505.2 and date changed 505.3. File 308 also includes extended attributes 510 in addition conventional attributes 505. Extended attributes 510 in the illustrated instance include record status 501 (record or non-record) with retention rule specification, value class 502, usage state 503 and its duration, and content-based information 504. Such representation is easily usable by storage 202 (FIG. 2) to make ILM Policy Decisions 304 (FIG. 3). These attributes 505 and 510 may be received from a lifecycle definition event, as described herein above and stored as a data structure. That is, attributes 505 and 510 may be included in the definition of a data state or state transition.

Figure 7:
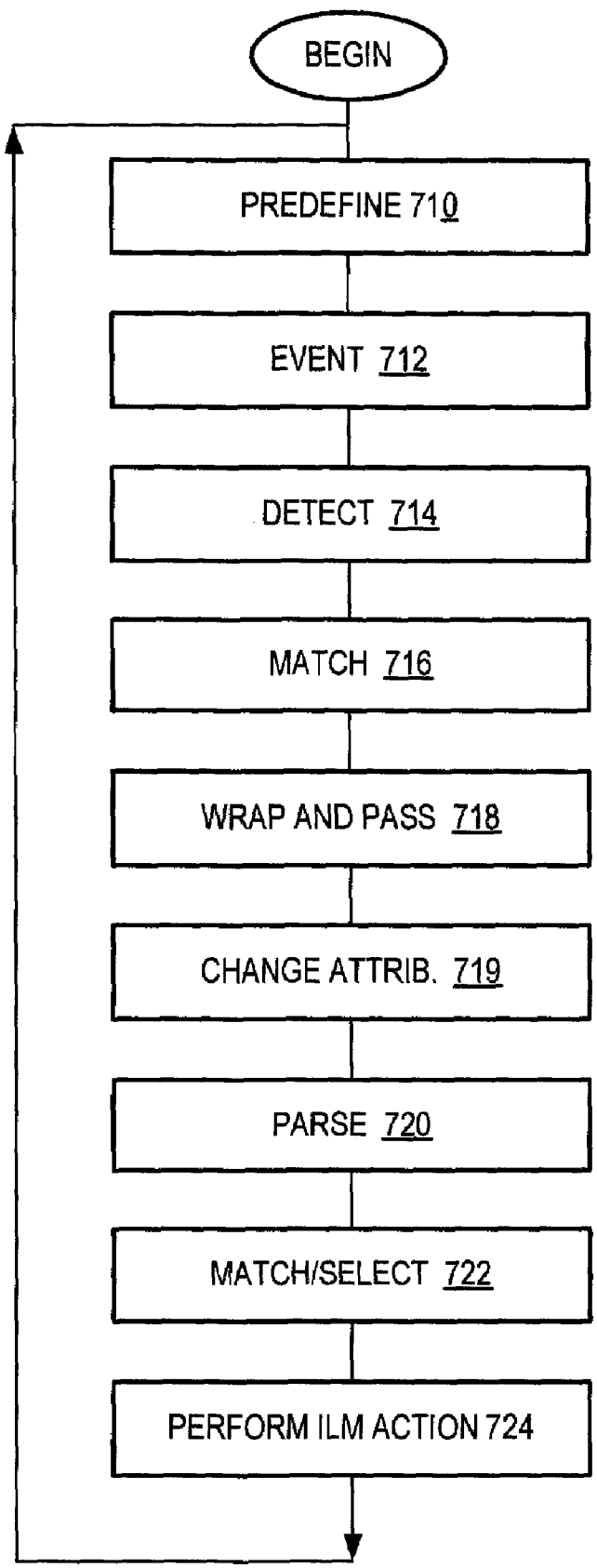
FIG. 7 illustrates a process for automatically performing ILM actions, according to an embodiment of the present invention.

Referring now to FIG. 7 a process is illustrated for managing data in a computer system based on extended file system attributes, according to an embodiment of the present invention. In the illustrative example, at 710 ILM model 220 predefines execution of a declare record statement by a process 311 as corresponding to a predefined state change 340 from an "approved" state 330 to an "archived" state 330, as described herein above with regard to FIG. 6. In this manner, ILM model 220 bridges a semantic gap between events at the level of processes 311 and information at the business semantic information level.

To pass business semantic information to storage 202, system 200 advantageously utilizes conventional file system API's. For instance, most file systems have extended attribute support. Network file system protocols such as NFSV4 also have extended attributes. Passing such semantic information can be done through standard calls such as setattr, without imposing new API modification requirements.

In the illustrative instance, process 311 performs a "declare record" event 712 for a file 306 responsive to a user input or a workflow. Responsive to detecting 714 the "declare record" event in process 311, ILM model 220 recognizes the event as having business semantic significance. ILM model 220 accomplishes this recognition by comparing 716 the process 311 declare record event to the set of predefined associations in the data structure of model 220 between the event and a state change 340 of lifecycle flow 320, and matching the event and the state change 340 from "approved" state 330 to "archived" state 330. Having detected the match, ILM model 220 wraps the declare record event as an NFSV4 call:

nfsv4_setattr("is-record", "old-state=no, new-state=yes")

where nfsv4_setattr( ) is a standard API, and passes 718 it to an NFS file server process in storage device level 202 of system 200, which, in turn, changes 719 an extended attribute 501 "record status" state of the data using an underlying conventional file system API. This also notifies ILSR logic 230 at 718 of the change. One or more of the data structures of ILSR logic 230 predefine: i) certain calls, i.e., state changes, such as this, ii) correspondence among the calls and file extended attributes 510, and iii) correspondence among the calls and ILM-related actions, such as moving data from non-WORM storage to WORM storage, for example.

ILSR logic 230, which is running on the file storage server in storage 202, parses 720 the received command and is thereby notified of the business meaning of the transaction giving rise to the call. Responsive to matching the changed attribute to one of the predetermined storage-related actions, logic 230 selects 722 and performs 724 the selected storage-related action and changes 726 an extended attribute 510. In the given example, in response to the call:

nfsv4_setattr("is-record", "old-state=no, new-state=yes")

logic 230 moves 724 the file data from non-WORM storage to WORM storage (both in storage device layer 202). (In such calls, both old and new ILM state information are passed from ILM model 220 to ILSR logic 230 so that ILSR logic 230 is able to understand state transitions 340 the file is going through and then act accordingly.)

ILM Policy Decisions

Other attributes useful for ILM are also generated responsive to the ILM-relevant meaning captured by ILM model 220 and are, likewise, added to files 306 passed to storage 202. ILSR logic 230 also uses added attributes of files 308 in combination with business-semantic-aware ILM policies for making ILM Policy 304, such as data placement in tiered storage, caching, migration, replication, retention, and backup/recovery, decisions regarding migration, retention, etc. That is, the extended attributes are relevant to, and easily usable by storage, CM, or other layers of system 200 to carry out business-semantic-aware ILM tasks.

Referring again to FIG. 3, once the useful business semantics are captured by the ILMM 302, they must be translated into a representation that is easily usable by storage, CM, or other layers of system to carry out business-semantic-aware ILM tasks. To achieve this, ILSR 230 has a set of key attributes for making ILM policy decisions 304 giving rise to ILM actions concerning matters such as data placement in tiered storage, caching, migration, replication, retention, and backup/recovery. Drivers for determining what policy 304 to use include the following:

1. Whether the information is a record or not (record status 501), and if so, what is the retention rule such as retention time for it.
2. What the business value (value class 502) of the information is. Value class 502 categories are highly valuable, valuable, less valuable, and not valuable, rather than absolute numbers, since absolute numbers may make it harder for data classification.
3. What usage state 503 it is in and the state duration. The usage state 503 can be classified into several categories, such as extremely active, active, less active, inactive, dormant. When the state has a known duration, that is, the state will change after that duration, that information is also passed in so that the underlying ILM policy decisions 304 can utilize such information for policy management.
4. What content-based information 504 is available for the document, such as keywords of the document. Such content-based information 504 may help storage to organize data in a way to facilitate fast search. For instance, documents with similar keywords may be located together to allow fast retrieval if documents are searched by keywords.

Once the business semantic information is available to storage in the form of ILSR 230 as described above, new ILM policies 304 can be developed to ensure compliance and improve system resource utilization.

ILM Actions: Migration and Caching

Traditional Hierarchical Storage Management (HSM) style migration policies are typically based on data usage patterns and time, such as migrating data from high-end storage to tape on a fixed time interval. With business-semantic-aware ILM, the migration policy can be improved in several ways. A few such policies, and ILM actions arising therefrom, are as follows:

1. According to one migration policy, if data is changed from non-record to a record state, a corresponding ILM action includes making a copy of the data and moving it to WORM storage.
2. According to another migration policy, if data has moved from an active to a less active or inactive state, a corresponding ILM action includes moving data directly from where it was to less expensive disks or tape storage. On the contrary, if the data is changed from inactive to active, it is then cached immediately, instead of waiting until the data is accessed, as a conventional caching algorithm would do.
3. According to another migration policy, if data is a record and usage is moved from active to inactive, a corresponding ILM action includes migrating the data from WORM disk to WORM tape.
4. According to another migration policy, if data is changed from a valuable to a less valuable or not valuable state, a corresponding ILM action includes migrating the data to less expensive disks or tapes without going through a fixed migration path as is typically done today. For this migration policy, the reverse is true for caching.
5. Conventionally a file would be moved from less secure, fast access to more secure, slow access storage based on conventional attribute time since last access 505.2. According to another migration policy, if the data has high value state, a corresponding ILM action includes keeping the most valuable data in the cache even if its usage is not very high, since such data often requires short latency when it's needed. If the data is not cached in relatively fast devices, it may be too costly to retrieve it from slow devices.

From the above list it should be appreciated that lifecycle definitions may include, as part of, or in addition to, data states, data state transitions and corresponding ILM actions, values and conditions governing the data states, data state transitions and corresponding ILM actions.

In general, explicit information state transitions are key factors for driving ILM policies 304, but within constraints of system limits, such as storage capacity limits and so on. For instance, according to another migration policy if highend storage is full, a corresponding ILM action includes selecting what data to migrate to secondary storage responsive to value classes 502, usage state 503, or a combination thereof.

Computer System Hardware

Figure 8:
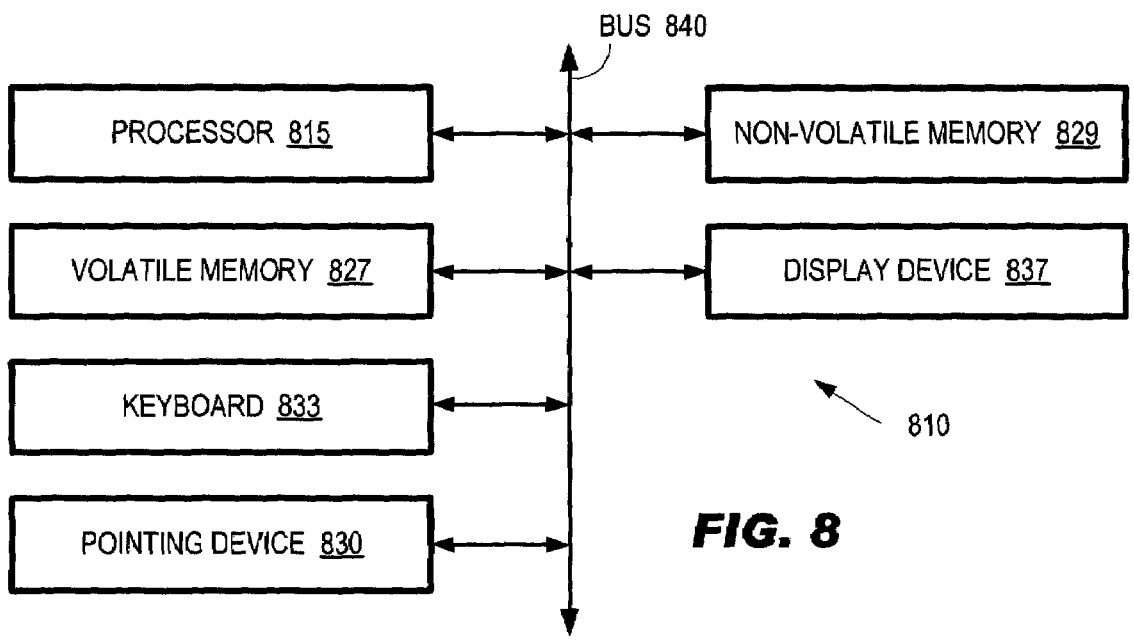
FIG. 8 illustrates a computer system with particular emphasis on certain hardware aspects of the system, according to an embodiment of the present invention.

Referring now to FIG. 8, illustrates the system 200 of FIG. 2 with particular emphasis on certain hardware aspects of the system, according to an embodiment of the present invention. System 200 takes the form of a computer system. It should be understood that the term "computer system" is intended to encompass any device having a processor that executes instructions from a memory medium, regardless of whether referred to in terms of a microcontroller, personal computer system, mainframe computer system, workstation, server, or in some other terminology. Computer system 200 includes processors 885, a volatile memory 827, e.g., RAM and a nonvolatile memory 829. Memories 827 and 829 store program instructions (also known as a "software program"), which are executable by processors 815, to implement various embodiments of a software program in accordance with the present invention. Processor or processors 815 and memories 827 and 829 are interconnected by bus 840. An input/output adapter (not shown) is also connected to bus 840 to enable information exchange between processors 815 and other devices or circuitry. System 200 also includes a keyboard 833, pointing device 830, e.g., mouse, and a display device 837.

In the illustrated embodiment, nonvolatile memory 829 includes a number of disks for data storage and another disk used for an operating system, software applications, and workloads. In other embodiments, the operating system may be on multiple disks or on some other nonvolatile store, not necessarily a disk. In another embodiment, the operating system may even be programmed in specialized chip hardware. Memory 829 also includes ROM, which is not shown, and may include other devices, which are also not shown, such as tapes.

The storing of data referred to herein above may include storing in a memory such as memory 827 or 829. the storing performed by a process as described herein above may be in memory 827 or 829 of the same computer system 200 on which the process is running or on a different computer system 200.

It should be appreciated from the forgoing that detecting business events and their correspondence to a uniform ILM model enables a wide domain of applications, such as WBI, to work in a business-semantic-aware ILM framework. The business-semantic-aware ILM system components detect workflow events that result in information state transitions and responsively take storage or other ILM-related actions for affected data. The business-semantic-aware ILM system components also detect new information state transition rules affecting the ILM model. That is, in a workflow application, such as an IBM Websphere application, a flow of events referred to as a workflow process is specified by a workflow process definition. Accordingly, a process of an ILM model software module extracts information state transition rules automatically from workflow process definitions responsive to a user defining or changing a workflow process specification in a workflow application, for example. Events that only lead to business process changes but do not relate to information itself need not be captured, such as signaling a supervisor to review a document.

Such business processes and rules are often defined in the form of workflow processes and/or information state definitions in CM, IRM, or higher layer applications such as WBI. They often generate business events that result in business significant information state transitions. For instance, a rejection event on an analyst report transforms the report from "reviewed" state to "rejected" state.

In addition, events that cause information usage patterns to be changed, such as active versus inactive, access control to be changed, such as changing from read-writable to read-only, information ownership to be changed, such as changing from one user to a group of users, etc. are captured by the business-semantic-aware ILM. Lifecycle definitions have explicit states such as active and dormant that are extracted and used as input to the ILM model.

It should be appreciated from the forgoing that the invention described herein closes semantic gaps between high level business-related and ILM-related processes. The resulting solution improves overall system trustworthiness, allows for global system resource optimization, ensures end-to-end seamless integration and contributes to efficient ILM across system layers. This, in turn, contributes to improved compliance to regulatory, corporate governance and other information-related requirements.

The description of the present embodiment has been presented for purposes of illustration, but is not intended to be exhaustive or to limit the invention to the form disclosed. Many modifications and variations will be apparent to those of ordinary skill in the art. For example, the processes of the present invention are capable of being distributed in the form of a computer readable medium of instructions. Such computer readable medium may have a variety of forms. The present invention applies equally regardless of the particular type of signal bearing media actually used to carry out the distribution. Examples of tangible computer readable media include recordable-type media such a floppy disc, a hard disk drive, a RAM, and CD-ROMs. Examples of transmission-type media include digital and analog communications links.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware depicted herein may vary depending on the implementation. The depicted example is not meant to imply architectural limitations with respect to the present invention.

The terms "logic," "model" and "memory" may have been used herein. While the logic and model referred to herein have generally been described in terms of instructions, data structures and computer processes, it should be understood that these terms may alternatively refer to circuitry that is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Herein above, or in the following claims, the term "comprises" is synonymous with "includes." The use of terminology such as "X comprises A, B and C" is not intended to imply that A, B and C are necessarily the only components or most important components of X.

Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for information lifecyle management (ILM), the method comprising:

receiving, by a process running on a computer system, a user-definition of ILM actions, data state transitions, and associations among the respective data state transitions and ILM actions and responsively storing a data structure representing the received data state transitions, ILM actions, and correspondence among the respective data state transitions and ILM actions;

automatically detecting, by a process for an ILM model running on the computer system, a workflow definition event in a monitored process running on a computer system, wherein the event includes defining a workflow;

the ILM model process notifying a storage process via storing an information lifecycle flow data structure responsive to the detected workflow definition event in the monitored process defining a data state transition matching one of the user-defined data state transitions, wherein the information lifecycle flow data structure models the matching data state transition, wherein the user-defined data state transitions include a record state transition, a value state transition and a usage state transition and wherein the user-defined ILM actions include caching the subject data and migrating the subject data;

performing, by the storage process responsive to the notifying, the ILM action corresponding to the matching data state transition, wherein the ILM action is a different action than the matching data state transition;

monitoring workflow application processes running on a computer system, wherein the workflow applications enable defining inputs, outputs, sequences and responsibilities for tasks and enable execution of and reporting about tasks, wherein the monitoring includes monitoring by a monitoring process running on a computer system, wherein the detecting of a workflow definition event is performed by the monitoring process, wherein the workflow definition events include initializing or changing definitions for respective workflows and wherein the user defined data state transitions define ILM-significant data state transitions;

detecting whether the initializing or changing of the workflow definitions define workflow state transitions matching ones of the stored data structure representing the user defined ILM-significant data state transitions;

comparing workflow process events of the workflow application processes monitored by the monitoring process to types of state transitions of the lifecycle flow data structure;

detecting occurrence of the matching workflow process event in the monitored workflow application processes by the monitoring process responsive to the comparing, wherein the matching workflow process event corresponds to the matching data state transition of the lifecycle flow data structure;

running the process for the ILM model in an application layer and the storage process in a storage device layer, and wherein the notifying of the storage process includes:
  performing a file system call by the ILM model running in the application layer;

wherein the method further includes:
setting an extended file system attribute by the storage process in the storage device layer responsive to the file system call; and
performing, for the ILM action corresponding to the matching data state transition, the corresponding ILM action in the storage device layer by the storage process responsive to the notifying, wherein data is subject to the corresponding ILM action, wherein the storage device layer is a layer of one or more storage device layers operable for primary and secondary storage modes, wherein the primary storage mode is relatively more expensive than the secondary storage mode, and wherein the ILM action corresponding to the matching data state transition includes:
  migrating the subject data directly to the secondary storage mode, without waiting for time-based migration, responsive to the subject data being changed from a valuable state to a less valuable state or a not valuable state, and migrating subject data to directly the primary storage mode, without waiting for time-based migration, responsive to the subject data being changed from the less valuable state or the not valuable state to the valuable state.

2. The method of claim 1, wherein performing the ILM action corresponding to the matching data state transition includes:
  making a copy of data and moving the data to WORM storage responsive to the data being changed from a non-record to a record state.

3. The method of claim 1, wherein a storage system is operable for a primary, caching storage mode and a secondary non-caching storage mode, and performing the ILM action corresponding to the matching data state transition includes:
  moving data directly from the primary storage mode to the secondary storage mode responsive to data changing from an active state to a less active or inactive state, and moving data directly from the secondary storage mode to the primary storage mode responsive to data changing from the less active or inactive state to the active state.

4. The method of claim 1, wherein the ILM action corresponding to the matching data state transition includes:
  migrating data from WORM disk to WORM tape responsive to the data being a record and the data state changing from an active state to an inactive state.

5. The method of claim 1, wherein performing the ILM action corresponding to the matching data state transition includes:
  keeping data in a caching storage mode responsive to a value state of the data exceeding a certain high value threshold even if a usage state of the data does not exceed a certain high usage threshold.

6. The method of claim 1, wherein a storage system is operable for primary and secondary storage modes, wherein the primary storage mode is relatively more expensive than the secondary storage mode, and performing the ILM action corresponding to the matching data state transition includes:
  selecting data to migrate to the secondary storage mode responsive to a combination of value and usage data states.

7. A computer program product for information lifecycle management (ILM), the computer program product comprising:
  a computer readable non-transitory storage medium having computer readable program code embodied therewith, the computer readable program code comprising:
  computer readable program code configured to cause a computer system to receive a user-definition of ILM actions, data state transitions, and associations among the respective data state transitions and ILM actions and responsively store a data structure representing the received data state transitions, ILM actions, and correspondence among the respective data state transitions and ILM actions;
  computer readable program code configured to cause a process for an ILM model running on the computer system to automatically detect a workflow definition event in a monitored process running on a computer system, wherein the event includes defining a workflow;
  computer readable program code configured to cause the ILM model process to notify a storage process via storing an information lifecycle flow data structure responsive to the detected workflow definition event in the monitored process defining a data state transition matching one of the user-defined data state transitions, wherein the information lifecycle flow data structure models the matching data state transition, wherein the user-defined data state transitions include a record state transition, a value state transition and a usage state transition and wherein the user-defined ILM actions include caching the subject data and migrating the subject data;

computer readable program code configured to cause the storage process to perform, responsive to the notifying, the ILM action corresponding to the matching data state transition, wherein the ILM action is a different action than the matching data state transition;

computer readable program code configured to cause a computer system to perform a monitoring process to monitor workflow application processes running on a computer system, wherein the workflow applications enable defining inputs, outputs, sequences and responsibilities for tasks and enable execution of and reporting about tasks, wherein the detecting of a workflow definition event is performed by the monitoring process, wherein the workflow definition events include initializing or changing definitions for respective workflows and wherein the user defined data state transitions define ILM-significant data state transitions;

computer readable program code configured to cause a computer system to detect whether the initializing or changing of the workflow definitions define workflow state transitions matching ones of the stored data structure representing the user defined ILM-significant data state transitions;

computer readable program code configured to cause a computer system to compare workflow process events of the workflow application processes monitored by the monitoring process to types of state transitions of the lifecycle flow data structure;

computer readable program code configured to cause a computer system to detect occurrence of the matching workflow process event in the monitored workflow application processes by the monitoring process responsive to the comparing, wherein the matching workflow process event corresponds to the matching data state transition of the lifecycle flow data structure;

computer readable program code configured to cause a computer system to run the process for the ILM model in an application layer and the storage process in a storage device layer, and wherein the notifying of the storage process includes:

performing a file system call by the ILM model running in the application layer;

computer readable program code configured to cause a computer system to set an extended file system attribute by the storage process in the storage device layer responsive to the file system call;

computer readable program code configured to cause a computer system to perform, for the ILM action corresponding to the matching data state transition, the corresponding ILM action in the storage device layer by the storage process responsive to the notifying, wherein data is subject to the corresponding ILM action, wherein the storage device layer is a layer of one or more storage device layers operable for primary and secondary storage modes, wherein the primary storage mode is relatively more expensive than the secondary storage mode, and wherein the ILM action corresponding to the matching data state transition includes:

migrating the subject data directly to the secondary storage mode, without waiting for time-based migration, responsive to the subject data being changed from a valuable state to a less valuable state or a not valuable state, and migrating subject data to directly the primary storage mode, without waiting for time-based migration, responsive to the subject data being changed from the less valuable state or the not valuable state to the valuable state.

8. The computer program product of claim 7, wherein performing the ILM action corresponding to the matching data state transition includes:
making a copy of data and moving the data to WORM storage responsive to the data being changed from a non-record to a record state.

9. The computer program product of claim 7, wherein a storage system is operable for a primary, caching storage mode and a secondary non-caching storage mode, and performing the ILM action corresponding to the matching data state transition includes:
moving data directly from the primary storage mode to the secondary storage mode responsive to data changing from an active state to a less active or inactive state, and moving data directly from the secondary storage mode to the primary storage mode responsive to data changing from the less active or inactive state to the active state.

10. The computer program product of claim 7, wherein the ILM action corresponding to the matching data state transition includes:
migrating data from WORM disk to WORM tape responsive to the data being a record and the data state changing from an active state to an inactive state.

11. The computer program product of claim 7, wherein a storage system is operable for primary and secondary storage modes, wherein the primary storage mode is relatively more expensive than the secondary storage mode, and performing the ILM action corresponding to the matching data state transition includes:
migrating data to secondary storage mode without going through a fixed migration path if the data is changed from a valuable state to a less valuable state or not valuable state and migrating data to the primary storage mode without going through a fixed migration path if the data is changed from the less valuable state or the not valuable state the valuable state.

12. The computer program product of claim 7, wherein performing the ILM action corresponding to the matching data state transition includes:
keeping data in a caching storage mode responsive to a value state of the data exceeding a certain high value threshold even if a usage state of the data does not exceed a certain high usage threshold.

13. The computer program product of claim 7, wherein a storage system is operable for primary and secondary storage modes, wherein the primary storage mode is relatively more expensive than the secondary storage mode, and performing the ILM action corresponding to the matching data state transition includes:
selecting data to migrate to the secondary storage mode responsive to a combination of the value and usage data states.

14. A computer system comprising:
a processor; and
a storage device connected to the processor, wherein the storage device has stored thereon an information lifecycle management (ILM) program for controlling the processor, and wherein the processor is operative with the program to execute the program for receiving a user-definition of ILM actions, data state transitions, and associations among the respective data state transitions and ILM actions and responsively storing a data structure representing the received data state transitions, ILM actions, and correspondence among the respective data state transitions and ILM actions;

wherein the processor is operative with the program to execute the program for automatically detecting, by a process for an ILM model running on the computer system, a workflow definition event in a monitored process running on a computer system, wherein the event includes defining a workflow;

wherein the processor is operative with the program to execute the program for the ILM model process notifying a storage process via storing an information lifecycle flow data structure responsive to the detected workflow definition event in the monitored process defining a data state transition matching one of the user-defined data state transitions, wherein the information lifecycle flow data structure models the matching data state transition, wherein the user-defined data state transitions include a record state transition, a value state transition and a usage state transition and wherein the user-defined ILM actions include caching the subject data and migrating the subject data;

wherein the processor is operative with the program to execute the program for performing, by the storage process responsive to the notifying, the ILM action corresponding to the matching data state transition, wherein the ILM action is a different action than the matching data state transition;

wherein the processor is operative with the program to execute the program for monitoring workflow application processes running on a computer system, wherein the workflow applications enable defining inputs, outputs, sequences and responsibilities for tasks and enable execution of and reporting about tasks, wherein the monitoring includes monitoring by a monitoring process running on a computer system, wherein the detecting of a workflow definition event is performed by the monitoring process, wherein the workflow definition events include initializing or changing definitions for respective workflows and wherein the user defined data state transitions define ILM-significant data state transitions;

wherein the processor is operative with the program to execute the program for detecting whether the initializing or changing of the workflow definitions define workflow state transitions matching ones of the stored data structure representing the user defined ILM-significant data state transitions;

wherein the processor is operative with the program to execute the program for comparing workflow process events of the workflow application processes monitored by the monitoring process to types of state transitions of the lifecycle flow data structure;

wherein the processor is operative with the program to execute the program for detecting occurrence of the matching workflow process event in the monitored workflow application processes by the monitoring process responsive to the comparing, wherein the matching workflow process event corresponds to the matching data state transition of the lifecycle flow data structure;

wherein the processor is operative with the program to execute the program for running the process for the ILM model in an application layer and the storage process in a storage device layer, and wherein the notifying of the storage process includes:
performing a file system call by the ILM model running in the application layer;

wherein the processor is operative with the program to execute the program for setting an extended file system attribute by the storage process in the storage device layer responsive to the file system call; and wherein the processor is operative with the program to execute the program for performing, for the ILM action corresponding to the matching data state transition, the corresponding ILM action in the storage device layer by the storage process responsive to the notifying, wherein data is subject to the corresponding ILM action, wherein the storage device layer is a layer of one or more storage device layers operable for primary and secondary storage modes, wherein the primary storage mode is relatively more expensive than the secondary storage mode, and wherein the ILM action corresponding to the matching data state transition includes:
migrating the subject data directly to the secondary storage mode, without waiting for time-based migration, responsive to the subject data being changed from a valuable state to a less valuable state or a not valuable state, and migrating subject data to directly the primary storage mode, without waiting for time-based migration, responsive to the subject data being changed from the less valuable state or the not valuable state to the valuable state.

15. The computer system of claim 14, wherein performing the ILM action corresponding to the matching data state transition includes:
making a copy of data and moving the data to WORM storage responsive to the data being changed from a non-record to a record state.

16. The computer system of claim 14, wherein a storage system is operable for a primary, caching storage mode and a secondary non-caching storage mode, and performing the ILM action corresponding to the matching data state transition includes:
moving data directly from the primary storage mode to the secondary storage mode responsive to data changing from an active state to a less active or inactive state, and moving data directly from the secondary storage mode to the primary storage mode responsive to data changing from the less active or inactive state to the active state.

17. The computer system of claim 14, wherein the ILM action corresponding to the matching data state transition includes:
migrating data from WORM disk to WORM tape responsive to the data being a record and the data state changing from an active state to an inactive state.

18. The computer system of claim 14, wherein a storage system is operable for primary and secondary storage modes, wherein the primary storage mode is relatively more expensive than the secondary storage mode and performing the ILM action corresponding to the matching data state transition includes:

migrating data to secondary storage mode without going through a fixed migration path if the data is changed from a valuable state to a less valuable state or not valuable state and migrating data to the primary storage mode without going through a fixed migration path if the data is changed from the less valuable state or the not valuable state the valuable state.

19. The computer system of claim 14, v wherein performing the ILM action corresponding to the matching data state transition includes:

keeping data in a caching storage mode responsive to a value state of the data exceeding a certain high value threshold even if a usage state of the data does not exceed a certain high usage threshold.

20. The computer system of claim 14, wherein a storage system is operable for primary and secondary storage modes, wherein the primary storage mode is relatively more expensive than the secondary storage mode, and performing the ILM action corresponding to the matching data state transition includes:

selecting data to migrate to the secondary storage mode responsive to a combination of the value and usage data states.

* * * * *